(12) United States Patent
Harris (10) Patent No.: US 7,370,001 B2
(45) Date of Patent: May 6, 2008

(54) METHOD AND SYSTEM OF FORECASTING UNSCHEDULED COMPONENT DEMAND

(75) Inventor: John M. Harris, Stone Mountain, GA (US)

(73) Assignee: Delta Airlines, Inc., Atlanta, GA (US)

( * ) Notice: Subject to any disclaimer, the term of this patent is extended or adjusted under 35 U.S.C. 154(b) by 0 days.

(21) Appl. No.: 10/072,971

(22) Filed: Feb. 12, 2002

(65) Prior Publication Data
US 2003/0158772 A1 Aug. 21, 2003

(51) Int. Cl.
*G06F 17/30* (2006.01)
(52) U.S. Cl. ............................................ 705/10; 705/8
(58) Field of Classification Search ................. 705/10, 705/7, 8, 28; 702/181, 183–4; 700/106, 700/108, 110
See application file for complete search history.

(56) References Cited

U.S. PATENT DOCUMENTS

| | | | | |
|---|---|---|---|---|
| 5,408,405 | A * | 4/1995 | Mozumder et al. ........... | 700/31 |
| 5,459,656 | A * | 10/1995 | Fields et al. .................... | 705/7 |
| 5,539,652 | A * | 7/1996 | Tegethoff ...................... | 703/14 |
| 5,608,621 | A * | 3/1997 | Caveney et al. ............... | 705/10 |
| 5,630,070 | A * | 5/1997 | Dietrich et al. ................ | 705/8 |
| 5,765,143 | A * | 6/1998 | Sheldon et al. ............... | 705/28 |
| 5,819,232 | A * | 10/1998 | Shipman ........................ | 705/8 |
| 5,930,762 | A * | 7/1999 | Masch ............................ | 705/7 |
| 5,946,662 | A * | 8/1999 | Ettl et al. ....................... | 705/8 |
| 6,151,582 | A * | 11/2000 | Huang et al. ................... | 705/8 |
| 6,205,431 | B1 * | 3/2001 | Willemain et al. ............ | 705/10 |
| 6,266,655 | B1 * | 7/2001 | Kalyan ........................ | 705/400 |
| 6,556,924 | B1 * | 4/2003 | Kariyawasam et al. ....... | 702/34 |
| 6,735,549 | B2 * | 5/2004 | Ridolfo ....................... | 702/181 |
| 6,738,748 | B2 * | 5/2004 | Wetzer ............................ | 705/9 |
| 6,748,341 | B2 * | 6/2004 | Crowder, Jr. ............... | 702/181 |
| 6,826,461 | B2 * | 11/2004 | Sinex ........................... | 701/29 |
| 6,834,256 | B2 * | 12/2004 | House et al. ............... | 702/181 |
| 7,016,825 | B1 * | 3/2006 | Tryon, III ...................... | 703/6 |
| 2002/0082856 | A1 * | 6/2002 | Gray et al. ................... | 705/1 |
| 2002/0095323 | A1 * | 7/2002 | Combs et al. ................. | 705/8 |
| 2002/0138311 | A1 * | 9/2002 | Sinex ............................ | 705/4 |
| 2002/0143599 | A1 * | 10/2002 | Nourbakhsh et al. .......... | 705/9 |
| 2003/0046250 | A1 * | 3/2003 | Kuettner et al. ............. | 705/400 |
| 2003/0055715 | A1 * | 3/2003 | Spence ........................ | 705/10 |
| 2003/0061126 | A1 * | 3/2003 | Erke et al. .................... | 705/28 |
| 2003/0233178 | A1 * | 12/2003 | Sinex .......................... | 701/29 |

OTHER PUBLICATIONS

"Capacity Planning", www.uoguelph.ca/~dsparlin/capacity.htm, Sep. 30, 1999 [retrieved May 27, 2003], pp. 1-4, retrieved from: google.com and archive.org.*

(Continued)

*Primary Examiner*—Beth Van Doren
(74) *Attorney, Agent, or Firm*—McKenna Long & Aldridge (57) ABSTRACT

A method of forecasting unscheduled component demand for a plurality of components in a fleet of assemblies includes establishing a set of models to be used for forecasting unscheduled component demand, selecting a best model for each component, and determining a date at which a cumulative probability of unscheduled component demand reaches a predetermined threshold.

7 Claims, 3 Drawing Sheets

OTHER PUBLICATIONS

Hillier et al., "Introduction to Operations Research", McGraw-Hill, 1995, 6th Edition, pp. 661-663, 672-673, 698-700, 916-917.*

"Method for Estimating Equipment Reliability", IBM Technical Disclosure, Oct. 1994, pp. 113-118, retrieved from: East Database, IBM Tech_Disclosures.*

Dagpunar, J.S., "A new approach for solving repair limit problems", European Journal of Operations Research, Feb. 16, 1999 [retrieved Nov. 21, 2007], pp. 1-12, retrieved from: Google.com.*

Kamara Israela, "Dynamic Inventory Allocation Models", Columbia University, 1992 [retrieved Nov. 21, 2007], pp. 1-2, retrieved from: Proquest Direct.*

Goheen, Lola Coleman, "On the Optimal Operating Policy for the Machine Repair Problem", 1977 [retrieved Nov. 21, 2007], pp. 484-493, retrieved from: Google.com.*

Truelove, Alan J., "Strategic Reliability and Preventive Maintenance", Operations Research, vol. 9, No. 1, pp. 22-29, 1961 [retrieved Nov. 21, 2007], retrieved from: JSTOR.*

Kim, S.H., et al., "Analysis of a Multi-Part Spares Inventory System", Journal of the Operational Research Society, Apr. 2001 [retrieved Nov. 21, 2007], pp. 418-432, retrieved from: JSTOR.*

Woo, York Y., "A class of (Q,R) inventory Models with partial Backorders, Poisson demands, and Erlang-distributed lead times", City University of New York, 1991 [retrieved Nov. 21, 2007], p. 1, retrieved from: Proquest Direct.*

Cheung, Ki Ling, et al., "Multiple Failures in a multi-item spares inventory model", IIE Transactions, Apr. 1995 [retrieved Nov. 21, 2007], v. 27, n.2, pp. 1-17, retrieved from: Dialog, file 31.*

* cited by examiner

METHOD AND SYSTEM OF FORECASTING UNSCHEDULED COMPONENT DEMAND

BACKGROUND OF THE INVENTION

1. Field of the Invention

This invention pertains to the field of planned maintenance and repair of components used in an assembly or collection of assemblies, such as an aircraft fleet, and more particularly, to a method and system of forecasting unscheduled component demand for such assemblies.

2. Description of the Related Art

The following terminology will be used throughout this application:

Assembly—a device or apparatus that includes a plurality of an individually replaceable and/or repairable portions;

Component (a.k.a. "part")—an individually replaceable and/or repairable portion of an assembly;

Fleet—collection of assemblies;

Part number—a unique identifier of an individual component included in an assembly;

Serviceable part—a particular component that can be used to replace a like component in an assembly;

Unserviceable part—a particular component that is in need of repair.

In the airline industry, a well-organized system and process for performing maintenance of an aircraft fleet is critical. Regularly scheduled routine maintenance of the aircraft fleet is carefully planned to meet governmental and company-established airline safety requirements, to minimize any disruption to revenue-generating flight schedules, and to contain inventory costs.

A typical aircraft fleet may consist of more than a dozen different types of aircraft (e.g., 18) having thousands of different types of components (e.g., more than 6700), and scheduled maintenance may be performed at dozens of different maintenance facilities located throughout the world.

Figure 1:
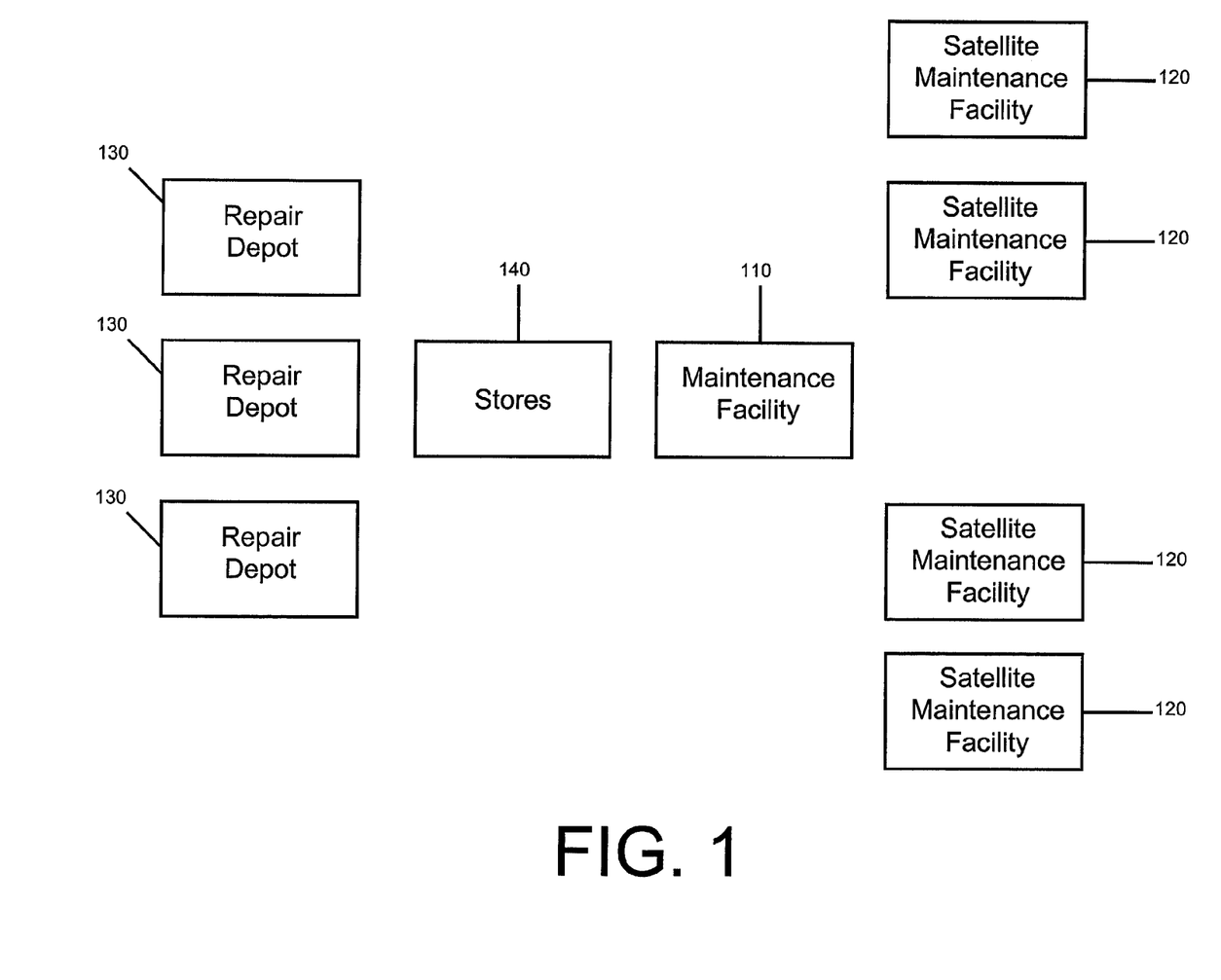
FIG. 1 is a functional block diagram of a system for maintaining an aircraft fleet.

FIG. 1 illustrates an exemplary arrangement of maintenance and repair facilities for an aircraft fleet. In a typical arrangement, an airline may have one or more centrally located maintenance facilities 110 for performing major routine scheduled maintenance jobs on the aircraft and/or components thereof. The airline also may have several satellite maintenance facilities 120, located at a number of different locations throughout its service area, for performing routine scheduled maintenance jobs. Typically, one or more repair depots 130 receive unserviceable parts from the various maintenance facilities 110, 120 and repair the unserviceable parts to produce serviceable parts. The serviceable parts are then kept in one or more central warehouses or stores 140 from which they are distributed to the maintenance facilities 110, 120.

To perform regularly scheduled routine maintenance, the proper serviceable parts must be made available at the various maintenance facilities 110, 120 at the scheduled time. Failure to have these serviceable parts available when and where they are needed can delay the scheduled maintenance, resulting in postponements or cancellations of revenue-generating flights. On the other hand, it is not cost effective to keep excess inventories of serviceable parts at each maintenance facility 110, 120 where routine maintenance is performed, or in the central stores 140.

Therefore, component repair schedules for the repair depot(s) 130 are carefully devised, considering many factors, including: the known routine maintenance schedules for all of the aircraft in the fleet; the locations of the maintenance facilities where the routine maintenance will be performed; the various components of each aircraft which will be replaced during the scheduled maintenance visits; the different personnel which are qualified to repair the various components; the typical time period required to repair each component; etc. Computer software has been developed to automate the process of preparing schedules for repairing the components needed for routine scheduled maintenance of the aircraft in the fleet.

However, routine scheduled maintenance is only one component of the overall problem of aircraft maintenance. The other major component is unscheduled, non-routine aircraft maintenance required by unexpected component failure. Unscheduled, non-routine aircraft maintenance in turn creates unscheduled component demand for serviceable parts.

Recently, it has been determined that as much as 80% of all component demand in an airline maintenance system is unscheduled component demand! Therefore, if such unscheduled component demand is not accounted for in the preparation of component repair schedules, serviceable parts will not be available when and where they are needed to perform unscheduled, non-routine aircraft maintenance. As noted above, the failure to have serviceable parts available when and where they are needed in turn will cause postponements or cancellations of revenue-generating flights.

However, until now there has not been a system or method for effectively or accurately forecasting and planning for such unscheduled component demand.

Meanwhile, it is also desired to produce a detailed work schedule for the repair depots 130. Such a detailed work schedule should preferably establish the exact order in which components are to be repaired. Ideally, a system and method for producing such a component repair schedule would instruct a component repair specialist as to exactly which component should be repaired next in order to optimize the availability of serviceable parts for the aircraft fleet. Such a system and method needs to consider many factors to produce the component repair schedule, including: a forecast of all unscheduled component demand for the aircraft fleet; the known routine maintenance schedules for all of the aircraft in the fleet; the locations of the maintenance facilities where the routine maintenance will be performed; the various components of each aircraft which will be replaced during the scheduled maintenance visits; the different personnel which are qualified to repair the various components; the typical time period required to repair each component; etc.

Similar problems to those described above exist in other industries and situations, for example: a trucking company having a fleet of trucks; a Navy having a fleet of ships; an emergency services (e.g., police) two-way radio communication system; an electric utility, a large computer network; etc. All of these situations, and others, could benefit from a system and method for effectively or accurately forecasting and planning for unscheduled component demand.

Accordingly, it would be advantageous to provide a system and method for effectively or accurately forecasting and planning for such unscheduled component demand. It would also be advantageous to provide a system and method for producing a component repair schedule that accounts for unscheduled component demand. Other and further objects and advantages will appear hereinafter.

SUMMARY OF THE INVENTION

The present invention comprises a system and method of forecasting unscheduled component demand for a group of assemblies.

In one aspect of the invention, unscheduled component demand for a plurality of components in a fleet of assemblies is forecast by establishing a set of models to be used for forecasting unscheduled component demand, selecting a best model for each component, and determining a date at which a cumulative probability of unscheduled component demand reaches a predetermined threshold.

In another aspect of the invention, a schedule for component repairs is produced from the unscheduled component demand forecast, together with component demand generated by routine, scheduled maintenance of the assemblies.

DESCRIPTION OF THE PREFERRED EMBODIMENTS

A preferred embodiment of a process for forecasting unscheduled component demand will be described herein with respect to components used in a fleet of aircraft maintained by an airline. Although the preferred process is described with respect to a process of unscheduled component demand for an aircraft maintenance system, the principles have wide applicability to forecasting component demand in a variety of other applications, for example: a trucking company having a fleet or trucks; a Navy having a fleet of ships; an emergency services (e.g., police) two-way radio communication system; an electric utility; a large computer network; etc.

Figure 2:
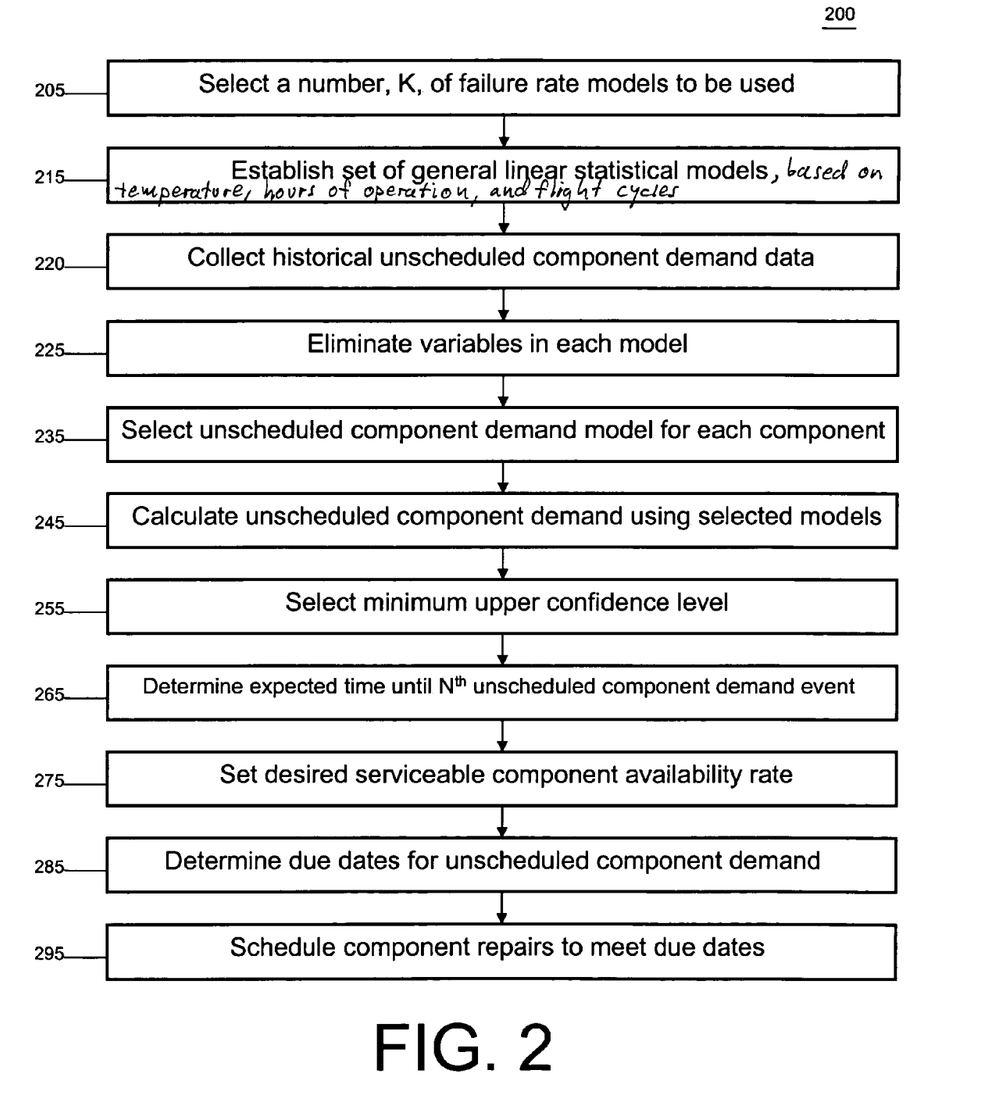
FIG. 2 is a flowchart of a method of forecasting unscheduled component demand for an aircraft fleet.

FIG. 2 illustrates a process of forecasting unscheduled component demand.

In a step 205, a number, K, of failure models to be used to model unscheduled component demand rates for all of the components in the fleet are selected. The number of models to be used, K, may be selected according to a variety of factors, including: the computational time required for the remainder of the process, which will increase as K is increased; a desired level of accuracy, which will generally also increase as K increases; etc.

In a preferred embodiment, K is selected to be 16, equally divided into eight models for unscheduled component demand as a function of flight cycles (operating cycles), and eight models for unscheduled component demand as a function of flight hours (operating hours).

In a next step, 215, the "K" models are established for modeling unscheduled component demand for all of the components. In a preferred embodiment, the models are a set of generalized linear statistical models.

In particular, unscheduled component demand for each component may be very closely approximated as being equal to the failure rate for the component within the fleet.

Moreover, it has been determined that the probability of component failure as a function of time may be presented and modeled using a Poisson distribution, as shown in Equation A:

$$P\{N(t)_{i,j,m} = f\}_k \cong e^{-\lambda_{i,j,k,m}*t} * \frac{(\lambda_{i,j,k,m}*t)^f}{f!}$$

where:
k=model number, where $k \subset \{1, 16\}$;
i=index representing a particular component type;
j=index representing a particular type of aircraft to which a component belongs;
m=month, where $m \subset \{1, 12\}$
$\lambda_{i,j,k,m}$=expected failure rate of component "i" on aircraft type "j" during month "m" using model "k;" and
N(t)=number of failures of component "i" from aircraft type "j" that fail during month "m" by time "t" using model "k."

Accordingly, in the preferred embodiment, establishing K different models for unscheduled component demand comprises establishing K models for $\lambda_{i,j,k,m}$ in Equation A.

In a preferred embodiment, K=16 and the following sixteen models are selected for k=1 to 16:

$\lambda_{i,j,1,m} = \beta_0 + \beta_1 \sin(TEMP_m)$  1.

$\lambda_{i,j,2,m} = \beta_0 + \beta_1 \cos(TEMP_m)$  2.

$\lambda_{i,j,3,m} = \beta_0 + \beta_1 \sin(HRSSHP_{j,m})$  3.

$\lambda_{i,j,4,m} = \beta_0 + \beta_1 \cos(HRSSHP_{j,m})$  4.

$\lambda_{i,j,5,m} = \beta_0 + \beta_1 TEMP_m + \beta_2 HRSSHP_{j,m}$  5.

$\lambda_{i,j,6,m} = \beta_0 + \beta_1 TEMP_{j,m}^3 + \beta_2 TEMP_m^2 + \beta_3 TEMP_m$  6.

$\lambda_{i,j,7,m} = \beta_0 + \beta_1 HRSSHP_{j,m}^3 + \beta_2 HRSSHP_{j,m}^2 + \beta_3 HRSSHP_{j,m}$  7.

$\lambda_{i,j,8,m} = \beta_0 + \beta_1 TEMP_m^2 + \beta_2 HRSSHP_{j,m}^2 + \beta_3 TEMP_m * HRSSHP_{j,m} + \beta_4 TEMP_m + \beta_5 HRSSHP_{j,m}$  8.

$\lambda_{i,j,9,m} = \beta_0 + \beta_1 \sin(TEMP_m)$  9.

$\lambda_{i,j,10,m} = \beta_0 + \beta_1 \cos(TEMP_m)$  10.

$\lambda_{i,j,11,m} = \beta_0 + \beta_1 \sin(CYCSHP_{j,m})$  11.

$\lambda_{i,j,12,m} = \beta_0 + \beta_1 \cos(CYCSHP_{j,m})$  12.

$\lambda_{i,j,13,m} = \beta_0 + \beta_1 TEMP_m + \beta_2 CYCSHP_{j,m}$  13.

$\lambda_{i,j,14,m} = \beta_0 + \beta_1 TEMP_m^3 + \beta_2 TEMP_m^2 + \beta_{83} TEMP_m$  14.

$\lambda_{i,j,15,m} = \beta_0 + \beta_1 CYCSHP_{j,m}^3 + \beta_2 CYCSHP_{j,m}^2 + \beta_3 CYCSHP_{j,m}$  15.

$\lambda_{i,j,16,m} = \beta_0 + \beta_1 TEMP_m^2 + \beta_2 CYCSHP_{j,m}^2 + \beta_3 TEMP_m * CYCSHP_{j,m} + \beta_4 TEMP_m + \beta_5 CYCSHP_{j,m}$  16.

where:
$\beta$=a coefficient indexed by p, where $p \subset \{1,5\}$
$HRSSHP_{j,m}$=average flight hours per aircraft type "j" during month m;
$CYCSHP_{j,m}$=average flight cycles per aircraft type "j" during month m; and
$TEMP_m$=actual or average national temperature during month "m."

For models 1-8 above, time (t) is measured in units of flight hours, while for models 9-16, time (t) is measured in units of flight cycles. Thus, for example, the coefficients β in models 1 and 9 are different from each other, etc.

In a step 220, past historical unscheduled component demand data is collected for a plurality of components used in an aircraft fleet. Unscheduled component demand data maybe closely approximated by using component failure data. Preferably, a database is constructed with entries for each component of each aircraft type. For each component type, records are created for each unscheduled demand event, indicating the number of flight hours and flight cycles between each unscheduled demand. Historical unscheduled component demand data may be gathered for any previous time period, e.g., three years. Preferably a rolling record of historical unscheduled component demand data may be maintained such that older data is periodically replaced in the database with newer data.

Figure 3:
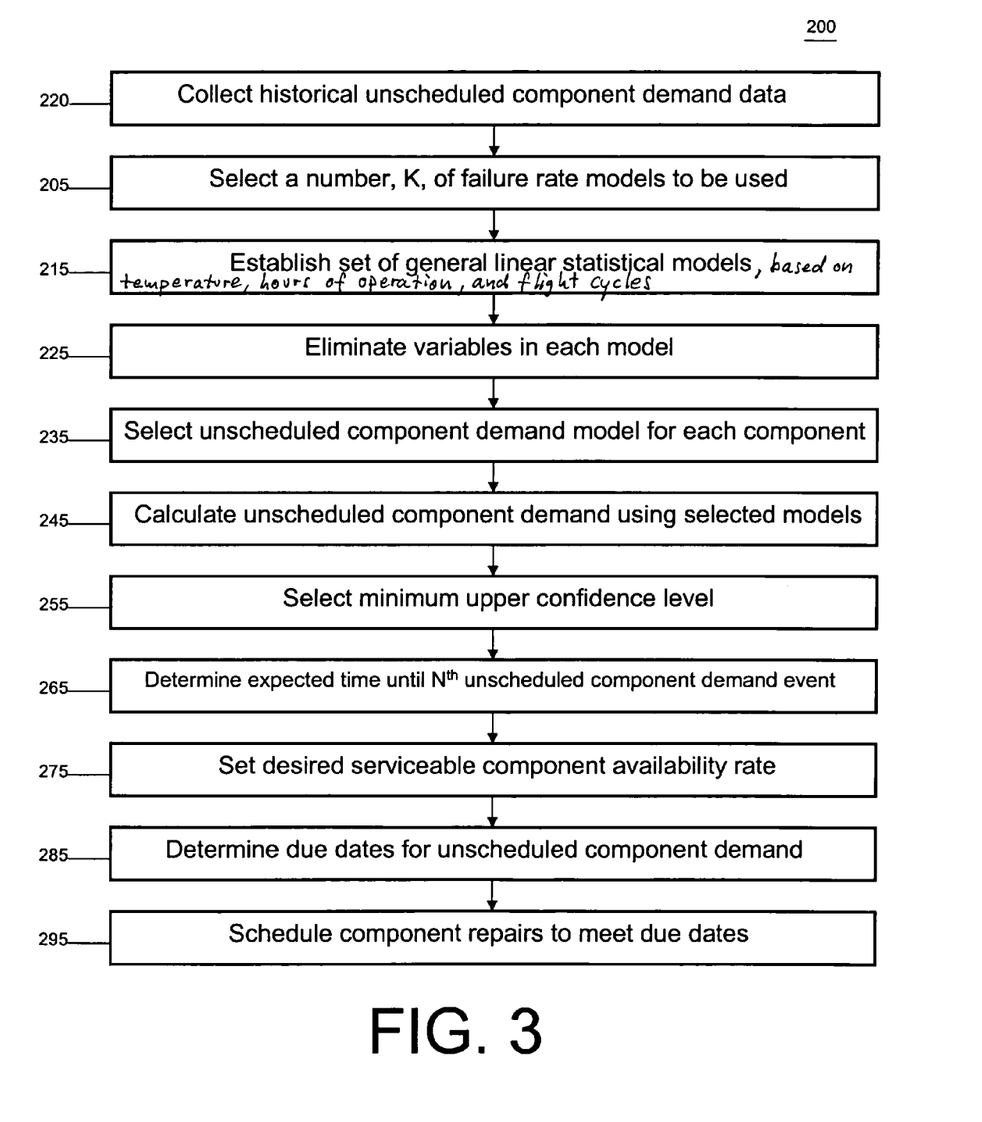
FIG. 3 is a flowchart of a second embodiment of a method of forecasting unscheduled component demand for an aircraft fleet.

Alternatively, the step 220 may be performed prior to step 215. Thus, in the alternative mode, step 220 would be prior to 205 and 215, as shown in FIG. 3.

Next, in a step 225, for each component the historical unscheduled component demand data collected in step 220 is used to eliminate insignificant variables or variables that cause multicollinearity from each of the K selected models. Such non-significant variables may be eliminated using one or more well-known statistical techniques, e.g., so-called t-tests; F-tests, Chi-squared tests; logistic regression; maximum likelihood analysis; etc. Further details regarding such a process of eliminated variables may be found in John Neter, et al., *Applied Linear Statistical Models* (3rd edition), the entirety of which is hereby incorporated by reference for all purposes as if fully set forth herein.

After eliminating undesired variables, in a step 235 one of the K models is selected to be used for modeling unscheduled component demand for each component. For each component, each of the K models is used for Poisson Regression analysis, various test are performed, and the results analyzed to determine which model gives the best estimate of X. Preferably, for each different component, so-called Pearson Chi-squared tests and residual analysis are used as metrics for choosing one of the K models to be used for modeling unscheduled component demand.

Then, in a step 245, the chosen model for each component is used to calculate the expected unscheduled demand for each component during each predetermined time period (e.g., month) for "X" time periods (e.g., months) into the future, together with upper confidence levels ranging from 5-99%.

In a step 255, a minimum upper confidence level is selected. The minimum upper confidence level establishes an expected confidence that the average unscheduled component demand during each time period (e.g., month) will not exceed the forecast. The minimum upper confidence level establishes an expected confidence that the average unscheduled component demand rate during each time period (e.g., month) will not exceed the forecasted rate.

Therefore, in the steps 205-255 above, a process of forecasting periodic (e.g., monthly) unscheduled component demand is accomplished.

It is noted that a confidence level is defined as follows. A U % upper confidence level (UCL) represents what U % of the observed results of a replicated experiment are predicted, with a predetermined confidence, to be no larger than a certain value. For example, suppose that a 75% upper confidence level for a demand rate for a part X on a Boeing 757 airplane in the month of July yields an expected 15 failures. Thus, if a fleet of Boeing 757 airplanes is flown under the same conditions 100 times (month) and the number of demands for part X is observed each time (month), then with a certain confidence, it is projected that 75% of those trials (75 out of the 100 demands) will have a demand of at most 15. The confidence of this prediction is based on the Type I error level threshold. Thus, each prediction of a confidence limit, expected value, etc., is made with about a 90% confidence.

Below is a formula for the UCL of lambda. Assuming that α is the allowable risk of underestimating the average failure rate that one is willing to accept, then a U=(1−α) upper confidence estimate for lambda is $$U = \lambda_{i,j,k,m} + z_{1-\alpha/2} * \sigma_{\lambda_{i,j,k,m}}$$

Where
1)

$$\sigma_{\lambda_{i,j,k,m}}$$

is the estimated standard deviation of $\lambda_{i,j,k,m}$ and is a function of the estimated covariance of the coefficient vector α and the variables in the model 2) $z_{1-\alpha/2}$ is the $100(1-\alpha/2)$ percentile of the standard normal distribution As an example, if an 80% UCL is desired, then α=20%.

In addition to forecasting unscheduled component demand, it is also desirable to actually schedule component repairs to satisfy a desired level of component availability for the aircraft maintenance system.

Accordingly, in a step 265, for each component the total expected time interval until the $n^{th}$ unscheduled component demand event is determined. Using the unscheduled component demand models 1 to 16 above, it has been shown that the probability distribution of the total time interval until the $n^{th}$ unscheduled component demand event follows an n-erlang distribution, as shown in Equation B:

$$P\{S_{n,i,j,m} \leq t\}_k \cong \begin{cases} 1 - \sum_{r=0}^{n-1} e^{-\lambda_{i,j,k,m}*t} \frac{(\lambda_{i,j,k,m}*t)^r}{r!} & \text{if } t \geq 0 \\ 0 & \text{otherwise} \end{cases}$$

where:

$S_{n,i,j,m}$=the total time interval until the $n^{th}$ failure for part "i" on aircraft type "j" during month "m" using model "k.

Using the failure rate models developed in Phase I and the forecasted number of failures during each month, it was proven that the distribution of "the total time until the nth failure" is an n-erlang distribution. Thus, if $S_{n,i,j,m}$ is the total time until the nth failure for part I on fleet j during month m using model k, then Equation B applies.

It should be noted that the probability density function of an n-erlang distribution is:

$$P\{S_{n,i,j,m} = t\}_k \cong e^{-\lambda_{i,j,k,m}*t} * \frac{(\lambda_{i,j,k,m}*t)^{n-1}}{(n-1)!}$$

where $S_{n,i,j,m}$=the total time interval until the $n_{th}$ failure for part "i" on aircraft type "j" during month "m" using model "k."

In a step 275, a desired serviceable component availability rate (part fill rate), $\alpha$, ($\alpha \subset \{0,1\}$) is selected for each component. In other words, for each component, a trade-off is made between the cost of maintaining excess inventory of serviceable parts and the cost of not having a serviceable part available for immediate maintenance of an aircraft. With this trade-off, a determination is made of an acceptable level of unavailability of serviceable parts.

In a subsequent step 285, during each predetermined time period (e.g., month), a "due date" is determined for each component at which the cumulative probability of occurrence of an unscheduled component demand event reaches (1-$\alpha$). For each component, the cumulative probability of occurrence of an unscheduled component demand event is calculated using Equation B and the $\lambda$ model, $\lambda_1$ to $\lambda_{16}$, selected for that component in the step 235. Preferably, the calculations are repeated periodically (e.g., daily) during the time period (e.g., month) for each component, accounting for all previous components.

Finally, in a step 295 component repairs are scheduled for each component to meet the due dates established in the step 285. Because unscheduled component demand has been forecast, component repair schedules are generated which not only satisfy the component demand requirements for scheduled routine maintenance of the aircraft, but also for unscheduled, non-routine maintenance.

Preferably, the process steps 245-295 may be repeated periodically to provide a forecast and repair schedule for every "X" months (e.g., three months). Also, the steps 220-295 may be repeated at a different, longer time interval to update the historical unscheduled component demand data and, if appropriate, to select a new model for unscheduled component demand for each component.

A methodology and examples of the present invention are discussed below.

Confidence interval for $\lambda$:

The confidence interval for $\lambda$ is equal to $\lambda$+(t test statistic) *(standard deviation of $\lambda$). The t-test statistic is a function of the error risk, $\lambda$, that one is willing to accept. The standard deviation of $\lambda$ is a function of the data variables used to develop the estimate of the expected failure rate.

Generalization of the Methodology Used:

Step 1: determine the amount of times between successive component removals (interarrival times).

Step 2: determine if the interarrival times are independent and identically distributed (i.i.d). For example, it is assumed that the interarrival times are independent and exponentially distributed.

Step 3: assuming that the interarrival times are i.i.d, use the interarrival times to create a model that represents the distribution of the time "until" a removal, for example, using the Poisson distribution.

Step 4: based on the distribution derived in Step 3, determine the stochastic counting process that models the process at which unscheduled component removals occur. For example, the process is a Poisson Process. In general, the process may be some derivation of a Renewal Process (see for example, Edward P. C. Kao, "An Introduction to Stochastic Process," Duxbury Press, 1997). The counting process derived is used to determine the expected number of events over a given period of time. For example, the parameter of the Poisson Process representing the average rate of removals, $\lambda$, is multiplied by the time unit, t, to determine the expected number of premature removals over time period, t. That is, the expected number of failures over t is $\lambda$t. Poisson regression is used to estimate $\lambda$.

Step 5: using the model of the counting process determined in Step 4, determine the model that represents the distribution of the time until the "$n^{th}$" event; i.e., the "total waiting time until" the "$n^{th}$" removal. For example, the Erlang distribution is the model that represents this distribution. In general, the equation derived is call the Renewal equation. The Erlang distribution is used to determine the goal due date for the expected component removals.

Example #1 of Methodology Application:

Using two years of component removal data (JAN99-DEC00) and the methodology described above in steps 1-4, forecast models representing the premature removal rates of each component, by fleet type, by month were derived, along with various confidence interval estimates. The total number of models derived was 5,777. Next, looking at the last 12 months of the history used, JAN00-DEC00, the lowest confidence interval that yielded an average monthly service level percentage of at least 90% was determined (assuming that the number of parts forecasted=number of parts produced). In the event that no confidence limit yielded such an average, the 99% confidence limit was used for future analysis. Monthly service level percentage is defined, for example, as min{1, (number of parts produced)/(number of parts demanded)}.

Next, for each model, a forecast of the expected number of premature removals over the months between JAN01 and AUG01 was made using the actual flying hours and cycles for each fleet during the same period. Afterwards, the results were aggregated to a part number (such as a Delta Part Number, DPN), by month level (i.e., the fleet type grouping was removed). Then, these results were compared to what actually happened between JAN01 and AUG01 with regards to unscheduled component removals. Assuming that the parts forecasted would have been produced for service, the average monthly service level of each DPN from JAN01 to AUG01 was determined. The average monthly service level per DPN, per component repair shop, is summarized in the fourth columns of Tables 1, 2, and 3, respectively. Heavy volume parts are defined as parts that average at least one removal per month during the historical period used (JAN99-DEC00) and the converse is true for parts classified as low volume parts. It is possible to use other statistically derived forecasted removal numbers, such as using a number so that there is only some X % chance of have "more" unscheduled removals. However, such a metric is undesirable because of the substantially higher inventory cost required to produce the higher volume of components.

Example #2 of Methodology Application:

Application for Example 2 is the same for Example 1, with one exception. Instead of using the lowest confidence interval that yielded an average monthly service level percentage of at least 90% from JAN00-DEC00, the mean estimate of each model was used. That is, no upper confidence limit was used. The analogous metrics of performance in Example 1 using the mean are presented in Tables 3, 4, and 5.

As expected, the metrics of performance are not as strong when simply using the mean of each forecasting model. Ironically, this is the metric traditionally used in the forecasting environment. These example may also provide an inference to the sensitivity surrounding this modeling methodology and how a strong probability and statistics background maybe needed to use the models adequately.

Based on the results, it can be inferred as a generalization that the models derived adequately represent the process at which unscheduled component removals occur. It should be noted that, in practice, the models are re-derived the first of each month and based on a rolling 2-year history of unscheduled component removals. Thus, the removal rates ($\lambda$s), expected number of removals each month, and goal repair due dates are constantly evaluated for precision and accuracy.

TABLE 1

Modeling Methodology Metrics of Performance for All Components that were Modeled

| Component Repair Shop | Total Number of Part Types | Total Number of Unscheduled Removals | Average Monthly Service Level Per DPN | Average 100% Daily Fill rate Per DPN |
|---|---|---|---|---|
| A | 141 | 4,940 | 78% | 79% |
| B | 68 | 880 | 76% | 81% |
| C | 243 | 3,391 | 74% | 79% |
| D | 47 | 729 | 64% | 74% |
| E | 211 | 6,043 | 72% | 74% |
| F | 452 | 3,325 | 67% | 79% |
| G | 265 | 4,782 | 71% | 79% |
| H | 137 | 4,380 | 75% | 74% |
| I | 204 | 4,509 | 76% | 78% |
| J | 318 | 8,172 | 73% | 77% |
| K | 216 | 1,423 | 65% | 83% |
| L | 178 | 8,202 | 75% | 81% |
| M | 22 | 49 | 44% | 79% |
| N | 3 | 14 | 100% | 100% |
| O | 111 | 452 | 66% | 85% |
| P | 113 | 362 | 59% | 82% |
| Q | 12 | 75 | 71% | 99% |
| R | 7 | 309 | 83% | 69% |
| S | 26 | 71 | 61% | 89% |
| T | 160 | 874 | 71% | 86% |
| U | 31 | 18,477 | 88% | 70% |
| V | 46 | 672 | 86% | 90% |
| W | 41 | 222 | 65% | 85% |
| X | 6 | 14 | 52% | 75% |
| Y | 110 | 784 | 62% | 79% |
| Z | 30 | 3,864 | 84% | 80% |
| AA | 4 | 32 | 93% | 88% |

TABLE 2

Modeling Methodology Metrics of Performance for All Heavy Volume Components that were Modeled

| Component Repair Shop | Total Number of Part Types | Total Number of Unscheduled Removals | Average Monthly Service Level Per DPN | Average 100% Daily Fill rate Per DPN |
|---|---|---|---|---|
| A | 76 | 4,448 | 89% | 81% |
| B | 33 | 765 | 87% | 82% |
| C | 85 | 2,754 | 83% | 77% |
| D | 12 | 595 | 84% | 73% |
| E | 99 | 5,457 | 80% | 71% |
| F | 79 | 1,749 | 78% | 72% |
| G | 110 | 3,994 | 85% | 78% |
| H | 78 | 3,996 | 83% | 74% |
| I | 90 | 3,900 | 83% | 75% |
| J | 124 | 7,191 | 82% | 75% |
| K | 41 | 808 | 79% | 72% |
| L | 78 | 7,700 | 85% | 78% |
| O | 9 | 132 | 76% | 82% |
| P | 8 | 96 | 54% | 60% |
| Q | 2 | 35 | 97% | 95% |
| R | 5 | 290 | 82% | 63% |
| S | 2 | 16 | 88% | 79% |
| T | 26 | 510 | 82% | 76% |
| U | 30 | 18,444 | 89% | 72% |
| V | 18 | 578 | 93% | 87% |
| W | 7 | 108 | 82% | 77% |
| Y | 19 | 535 | 80% | 69% |
| Z | 25 | 3,853 | 87% | 79% |
| AA | 1 | 24 | 100% | 100% |

TABLE 3

Modeling Methodology Metrics of Performance for All Low Volume Components that were Modeled

| Component Repair Shop | Total Number of Part Types | Total Number of Unscheduled Removals | Average Monthly Service Level Per DPN | Average 100% Daily Fill rate Per DPN |
|---|---|---|---|---|
| A | 65 | 492 | 61% | 77% |
| B | 35 | 115 | 54% | 80% |
| C | 158 | 637 | 63% | 80% |
| D | 35 | 134 | 52% | 74% |
| E | 112 | 586 | 59% | 76% |
| F | 373 | 1,576 | 63% | 81% |
| G | 155 | 788 | 53% | 81% |
| H | 59 | 384 | 58% | 75% |
| I | 114 | 609 | 66% | 80% |
| J | 194 | 981 | 61% | 78% |
| K | 175 | 615 | 59% | 86% |
| L | 100 | 502 | 62% | 84% |
| M | 22 | 49 | 44% | 79% |
| N | 3 | 14 | 100% | 100% |
| O | 102 | 320 | 65% | 85% |
| P | 105 | 266 | 60% | 83% |
| Q | 10 | 40 | 61% | 100% |
| R | 2 | 19 | 89% | 82% |
| S | 24 | 55 | 55% | 90% |
| T | 134 | 364 | 65% | 89% |
| U | 1 | 33 | 50% | 27% |
| V | 28 | 94 | 76% | 91% |
| W | 34 | 114 | 58% | 87% |
| X | 6 | 14 | 52% | 75% |
| Y | 91 | 249 | 54% | 82% |
| Z | 5 | 11 | 53% | 88% |
| AA | 3 | 8 | 88% | 83% |

TABLE 4

Modeling Methodology Metrics of Performance for All Components that were Modeled (using the Mean for each model)

| Component Repair Shop | Total Number of Part Types | Total Number of Unscheduled Removals | Average Monthly Service Level Per DPN | Average 100% Daily Fill rate Per DPN |
|---|---|---|---|---|
| A | 141 | 4,940 | 68% | 65% |
| B | 68 | 880 | 67% | 72% |
| C | 243 | 3,391 | 63% | 70% |
| D | 47 | 729 | 61% | 69% |
| E | 211 | 6,043 | 62% | 63% |
| F | 452 | 3,325 | 58% | 71% |
| G | 265 | 4,782 | 62% | 68% |
| H | 137 | 4,380 | 67% | 63% |
| I | 204 | 4,509 | 63% | 64% |
| J | 318 | 8,172 | 63% | 67% |
| K | 216 | 1,423 | 55% | 72% |
| L | 178 | 8,202 | 65% | 69% |
| M | 22 | 49 | 43% | 82% |
| N | 3 | 14 | 100% | 100% |
| O | 111 | 452 | 55% | 70% |
| P | 113 | 362 | 46% | 72% |
| Q | 12 | 75 | 76% | 82% |
| R | 7 | 309 | 63% | 44% |
| S | 26 | 71 | 46% | 85% |
| T | 160 | 874 | 62% | 77% |
| U | 31 | 18,477 | 84% | 62% |
| V | 46 | 672 | 74% | 76% |
| W | 41 | 222 | 51% | 71% |
| X | 6 | 14 | 38% | 55% |
| Y | 110 | 784 | 53% | 69% |
| Z | 30 | 3,864 | 77% | 66% |
| AA | 4 | 32 | 83% | 86% |

TABLE 5

Modeling Methodology Metrics of Performance for All Heavy Volume Components that were Modeled (using the Mean for each model)

| Component Repair Shop | Total Number of Part Types | Total Number of Unscheduled Removals | Average Monthly Service Level Per DPN | Average 100% Daily Fill rate Per DPN |
|---|---|---|---|---|
| A | 76 | 4,448 | 77% | 65% |
| B | 33 | 765 | 79% | 71% |
| C | 85 | 2,754 | 75% | 67% |
| D | 12 | 595 | 77% | 65% |
| E | 99 | 5,457 | 73% | 60% |
| F | 79 | 1,749 | 72% | 65% |
| G | 110 | 3,994 | 77% | 67% |
| H | 78 | 3,996 | 76% | 64% |
| I | 90 | 3,900 | 74% | 63% |
| J | 124 | 7,191 | 75% | 65% |
| K | 41 | 808 | 73% | 63% |
| L | 78 | 7,700 | 78% | 67% |
| O | 9 | 132 | 61% | 69% |
| P | 8 | 96 | 46% | 54% |
| Q | 2 | 35 | 97% | 95% |
| R | 5 | 290 | 68% | 46% |
| S | 2 | 16 | 62% | 41% |
| T | 26 | 510 | 75% | 70% |
| U | 30 | 18,444 | 85% | 64% |
| V | 18 | 578 | 82% | 73% |
| W | 7 | 108 | 81% | 75% |
| Y | 19 | 535 | 74% | 62% |
| Z | 25 | 3,853 | 78% | 65% |
| AA | 1 | 24 | 98% | 95% |

TABLE 6

Modeling Methodology Metrics of Performance for All Low Volume Components that were Modeled (using the Mean for each model)

| Component Repair Shop | Total Number of Part Types | Total Number of Unscheduled Removals | Average Monthly Service Level Per DPN | Average 100% Daily Fill rate Per DPN |
|---|---|---|---|---|
| A | 65 | 492 | 50% | 65% |
| B | 35 | 115 | 44% | 73% |
| C | 158 | 637 | 51% | 73% |
| D | 35 | 134 | 51% | 71% |
| E | 112 | 586 | 46% | 66% |
| F | 373 | 1,576 | 53% | 73% |
| G | 155 | 788 | 44% | 69% |
| H | 59 | 384 | 47% | 60% |
| I | 114 | 609 | 49% | 65% |
| J | 194 | 981 | 50% | 68% |
| K | 175 | 615 | 47% | 74% |
| L | 100 | 502 | 48% | 71% |
| M | 22 | 49 | 43% | 82% |
| N | 3 | 14 | 100% | 100% |
| O | 102 | 320 | 54% | 70% |
| P | 105 | 266 | 46% | 73% |
| Q | 10 | 40 | 66% | 79% |
| R | 2 | 19 | 47% | 38% |
| S | 24 | 55 | 43% | 90% |
| T | 134 | 364 | 56% | 79% |
| U | 1 | 33 | 46% | 20% |
| V | 28 | 94 | 61% | 79% |
| W | 34 | 114 | 39% | 70% |
| X | 6 | 14 | 38% | 55% |
| Y | 91 | 249 | 43% | 71% |
| Z | 5 | 11 | 55% | 75% |
| AA | 3 | 8 | 70% | 83% |

While preferred embodiments are disclosed herein, many variations are possible which remain within the concept and scope of the invention. Such variations would become clear to one of ordinary skill in the art after inspection of the specification, drawings and claims herein. The invention therefore is not to be restricted except within the spirit and scope of the appended claims.

What is claimed is:

1. A computer-implemented method for determining a time interval at which unscheduled demand for the components is expected to occur, comprising:
   computing a plurality of statistical models for a probability of unscheduled component demand as a function of time and a failure rate of a component, wherein each of the plurality of computed statistical models includes a distinct linear combination of variables pertaining to component use, and wherein each of the computed statistical models comprises an N-erlang distribution wherein the N-erlang distribution includes a parameter $\lambda$;
   for each component, collecting historical unscheduled component demand data;
   for each component, using the collected historical unscheduled component demand data to select one computed statistical model from the plurality of computed statistical models, wherein the selected computed statistical model most closely matches the historical unscheduled component demand data, and wherein the step of selecting one of the computed statistical models includes selecting an equation for the parameter $\lambda$;
   for each component, selecting an allowable probability of underestimating an average failure rate, $\alpha$; and using the selected computed statistical model to calculate a time interval at which the unscheduled component demand is expected to occur.

2. The method of claim 1, wherein using the selected computed statistical model comprises calculating a time interval when a probability of a next unscheduled component demand event equals the probability that the unscheduled component demand will not exceed the allowable probability (1-α).

3. The method of claim 1, further comprising eliminating insignificant variables and variables that cause multicollinearity from each of the computed statistical models using the historical unscheduled component data.

4. The method of claim 1, wherein the failure rate of the component is a function of temperature.

5. The method of claim 1, wherein the failure rate of the component is a function of hours of operation.

6. The method of claim 1, wherein the failure rate of the component is a function of flight cycles.

7. A computer-implemented method for forecasting unscheduled demand for a plurality of different components, comprising the steps of:

computing a plurality of statistical models for modeling unscheduled demand for the components as a function of a failure rate of each of the components, wherein each of the plurality of computed statistical models includes a distinct linear combination of variables pertaining to component use, and wherein each of the computed statistical models comprises an N-erlang distribution wherein the N-erlang distribution includes a parameter $\lambda$;

for each component, collecting historical unscheduled component demand data;

for each component, selecting one of the computed statistical models of the plurality of computed statistical models for a probability of unscheduled component demand, wherein the selected computed statistical model most closely matches the historical unscheduled demand data corresponding to the component, and wherein the step of selecting one of the computed statistical models includes selecting an equation for the parameter $\lambda$; and for each component, determining a date at which a cumulative probability of unscheduled component demand reaches a predetermined threshold.

* * * * *